Feb. 13, 1934.  I. L. DUNN ET AL  1,946,575
PRESSURE RECORDING GAUGE
Filed Feb. 18, 1932

INVENTORS
Irwin L. Dunn
Harry F. Wright
Harold S. Crooks
BY
ATTORNEY

Patented Feb. 13, 1934

1,946,575

UNITED STATES PATENT OFFICE

1,946,575

PRESSURE RECORDING GAUGE

Irwin L. Dunn, Harry F. Wright, and Harold S. Crooks, Tulsa, Okla.

Application February 18, 1932. Serial No. 593,738

4 Claims. (Cl. 234—17)

Our invention relates to pressure measuring devices, and more particularly to pressure recording gauges for measuring and recording the reservoir pressure—commonly known as rock pressure—at various depths in oil and gas wells, or other borings.

The pressure existing at the producing horizon of an oil and/or gas pool is the primary source of energy utilized for removing fluid from the well, and a definite knowledge of this pressure is the most important requisite in determining the manner of and rate at which the oil and gas may be most efficiently and economically removed.

Because of wide variation in specific gravity of the column of fluid in a well, the only satisfactory method of measuring pressure in the bottom of the hole is to lower into the well a gauge which will measure and record the pressure at any given depth.

Various instruments have been devised for this purpose, some of them being capable of recording only a single pressure for each run of the instrument into the well, while others are exceedingly delicate and complicated.

The principal object of our invention is, therefore, to provide a gauge of simple and rugged construction whereby the pressures at various depths in a well may be recorded during a single run of the instrument into the well.

In accomplishing this and other objects of our invention we have provided improved details of structure, the preferred form of which is illustrated in the accompanying drawing, wherein.

Figure 1:
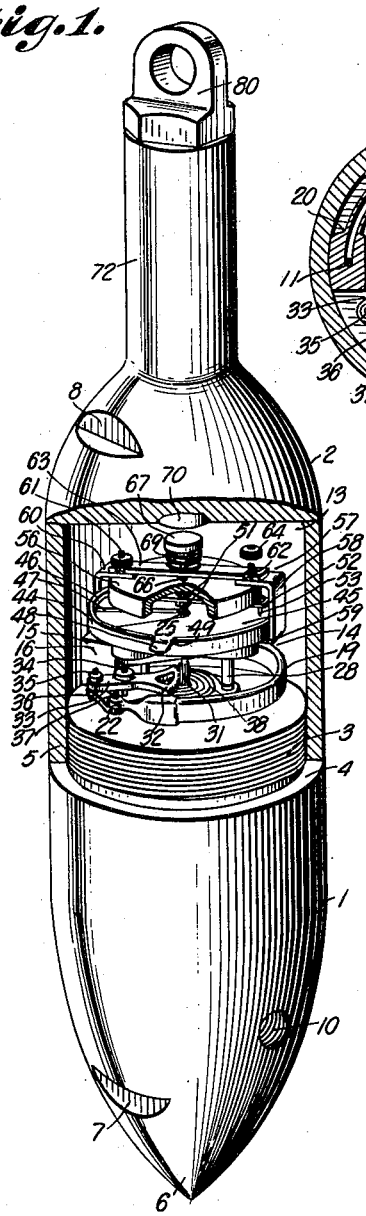
Fig. 1 is a perspective view of a gauge constructed in accordance with our invention, a portion of the upper housing section being broken away to more clearly disclose the operating mechanism of the device.
Figure 3:
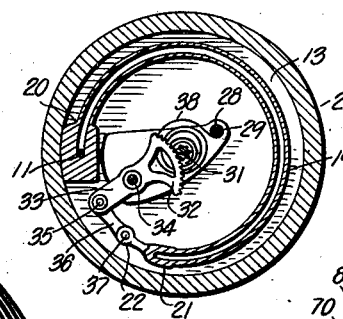
Fig. 3 is a cross section on the line 3—3, Fig. 2.

Referring more in detail to the drawing:

1—2 designate lower and upper housing sections, the lower section having a reduced externally threaded neck 3 forming a lateral shoulder 4, and the upper cylindrical section having an internally threaded lower end 5 engaging the neck and abutting the lateral shoulder to produce a fluid tight joint between the sections.

The lower section terminates in a bullet type nose 6 to facilitate downward passage of the instrument through a conduit and through a column of liquid in the conduit, and notches 7 and 8 are provided adjacent the tapered end of the lower section and on the upper section for receiving suitable wrenches to thread the housing sections firmly together.

Figure 2:
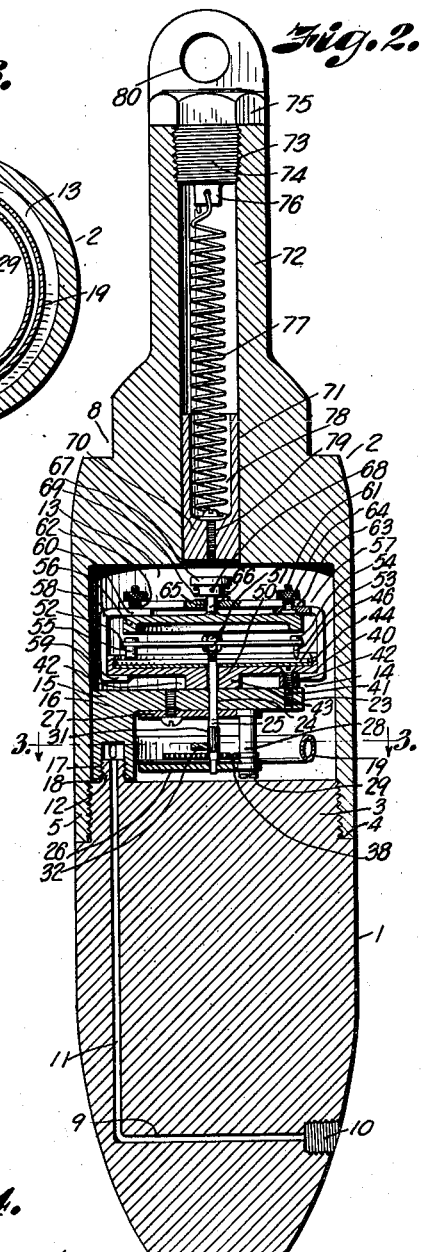
Fig. 2 is a central vertical section of the instrument.

As shown in Fig. 2, the lower section comprises a solid body of metal to provide the necessary weight for insuring passage of the instrument through a heavy body of liquid, and within the body is formed an inlet channel 9 including a horizontal port opening through the side of the lower section for inlet of well fluid to the instrument and preferably terminating in an enlarged internally threaded socket 10 adapted to receive the fitting of a suitable device for testing the accuracy of the instrument, the channel having the vertical portion 11 opening through an upstanding externally threaded boss 12 formed on the upper end of the lower section adjacent the edge thereof.

The upper section is counter-bored to form a chamber 13 for receiving a pressure unit 14 including a bracket member 15 having a downwardly depending pedestal 16 provided with a threaded socket 17 to engage the upstanding boss 12 of the lower section, a lead washer 18, or the like, being preferably inserted between the pedestal and boss for sealing the joint between said members.

The unit 14 includes a tubular distensible member 19 of arcuate form having one end secured to the pedestal 16 by welding, or the like, as indicated at 20, to communicate the inlet channel with the tubular member. At its opposite end the distensible member is closed, as shown at 21, and terminates in an ear 22 pivotally connected to recording mechanism, now to be described in detail.

Extending laterally from the pedestal 16 is a horizontal shelf portion 23 provided on an axial line of the housing with a bearing opening 24 for rotatably receiving a shaft 25 journalled in the opening and in aligning openings of spaced plates 26 and 27, secured to the shelf portion by spacers 28 and screws 29.

Mounted on the shaft between the spaced plates is a gear 31 meshing with the sector 32 of an actuating arm 33 pivotally mounted on a shaft 34 also having opposite ends fixed in the spaced plates in parallel relation with the shaft 25. The outer end of the actuating arm is pivotally connected by a screw 35 to a link 36 connected in turn by a pin 37 with the ear 22 of the distensible member, so that distention of the tubular member, effected by increase of pressure entering the inlet port, will move the arm counter-clockwise, thereby rotating the shaft 25 in a clockwise direction.

A convolute spring 38 having its outer end fixed to one of the spacers and its inner end to the shaft 25, is provided to impart a slight tension on the arcuate member to assist in returning the member to normal position upon release of pressure from the instrument.

Mounted on and frictionally engaging the portion of the shaft 25 projecting through the shelf portion 23 is a circular carrier 40 secured to the shelf by screws 41 extended through spacers 42 and threaded into the shelf, a neck 43 formed concentrically on the carrier serving to rigidly space the central portion of the carrier from the shelf.

The carrier is further provided with an inwardly directed annular flange 44 for retaining a blank or graduated record disk 45 that may be removably seated on the carrier and preferably held therein by a spring wire 46 engaging the flange 44.

As shown in Fig. 1 of the drawing, the record disk may be provided with a notch 47 to permit mounting of the disk on the carrier, as will be later more fully described, and is further provided with an ear 48 seated in a notched portion 49 of the flange to facilitate removal of the disk from the carrier and to prevent rotation of the disk independently of the carrier. It will be apparent that the blank disk may be graduated in any desirable manner to simplify the procedure of accurately calculating and well pressure.

The shaft 25 extending freely through a concentric opening 50 of the carrier is of sufficient length to project above the carrier and is threaded at its upper end for receiving a pair of nuts 51 to support therebetween a resilient hand 52 of a length to extend substantially diametrically across the carrier. Fixed on one end of the hand is a downwardly extending marker or pin 53 provided with a head 54 and adapted to contact a record disk supported on the carrier to mark the disk. On its opposite end the hand is provided with a stop lug 55.

The disk being provided with the notch 47, may be moved laterally over the shaft 25 into position in the carrier without removing the marker from the shaft.

In order to effect contact of the marker with the record at the will of the operator, actuating mechanism for the marker is provided including a circular striker 56 of sufficient diameter to coincidently contact both ends of the centrally mounted hand 52.

The striker is concentrically suspended above the carrier by a bridge assembly 57 comprising opposite brackets 58 having lower lateral ears 59 fixed to the lower face of the carrier by any suitable means such as welding, and having upper lateral ears 60 provided with posts 61 for seating in slots 62 of a cross bar 63, binding nuts 64 being threaded on the posts for removably securing the cross bar to the brackets.

The cross bar is further provided with a central opening 65 for slidably receiving a shaft 66 fixed concentrically to the striker and having a flanged head 67 secured to its upper end by a cross pin 68 or the like so that downward movement of the striker is limited by stop-engagement of the head with the bar. A spring 69 is seated between the cross bar and head to normally space the striker from the hand 52.

The head of the striker is adapted to be engaged and to be forced into contact with the record disk by a weight 70 slidably mounted in a reduced bore 71 opening into the chamber 13 and extending upwardly and concentrically through a neck 72 provided on the upper housing section 2. At its upper end the bore is internally threaded as shown at 73, for engaging the threaded reduced portion 74 of an anchoring bolt 75. Formed on the lower end of the bolt is an apertured boss 76 for anchoring the upper end of a spring 77 having its lower end secured in a socket 78 of the weight by any suitable means, such as a screw 79 threaded into the weight.

An eye 80 may be formed integrally with the upper face of the anchoring bolt to receive a line for lowering or elevating the instrument in a well hole.

Assuming a device to be constructed and assembled as described, the operation thereof would be as follows:

A line, preferably a measuring line, is secured in the ear of the anchoring bolt and the device is lowered by means of the line into the well. As the instrument travels downwardly into the well, the distensible member will be subjected to the pressure existing in the well and will distend in direct proportion to the well pressure, and the shaft 25, being operably connected with the tubular member, will be correspondingly rotated, thus turning the hand 52.

After the instrument has been lowered to the desired depth, the line is suddenly jerked to jar the instrument which may be accomplished in various manners, such as permitting the instrument to drop for a slight distance and to then stop it abruptly, thereby causing the weight to continue downwardly under its own momentum, delivering an impact on the striker which in turn bends both ends of the resilient hand downwardly to cause the marker to prick the disk, thus forming a record thereon.

Due to simultaneous contact of the stop lug on the other end of the hand with the blank, bending of the shaft 25 is prevented, and downward movement of the striker is limited by engagement of the head 67 with the cross bar. It will be obvious that the striker is returned and normally held in spaced relation with the resilient hand by the spring 69.

As the well pressure varies at different depths, impressions made on the disk at intervals while the device is being lowered will provide a record of the pressures at different depths, and if desired, similar impressions may be made on the disk at corresponding depths as the device is being elevated to determine whether or not the pressures have remained substantially constant.

After the instrument has been removed from the well bore, the housing sections are disassembled and after the record has been examined and the well pressure calculated therefrom the record may be filed for future reference.

From a knowledge of the existing pressures at different depths in the well, it will be possible to determine the size of tubing required for most efficiently and economically flowing a well by fluid pressure.

The pressures at the bottom of the well are also the index of the ability of the well to produce, and from a periodic measurement of these pressures the decline in potential capacity and the probable ultimate production can be estimated.

Since with our device, the actual pressure at the bottom of a gas well, as distinct from oil wells, can be measured accurately, the potential capacity can be calculated much more accurately and rapidly than with present methods.

Figure 4:
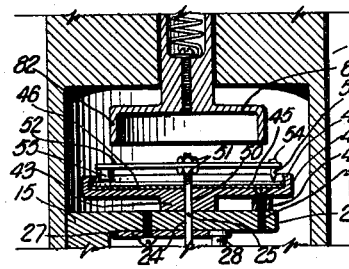
Fig. 4 is a fragmentary sectional view showing a modified form of record-marking mechanism.

The only difference in the modified form illustrated in Fig. 4, from the preferred form heretofore described, is that the weight member 70 is provided with an enlarged concentric head 81 having a downwardly depending flange 82 adapted to strike both ends of the hand 52.

The operation of the modified form of structure is identical to that of the preferred form, although it will be apparent that no means is provided for limiting the force of the impact on the resilient hand in the modified device.

What we claim and desire to secure by Letters Patent is:

1. A pressure indicating device including a housing, means in the housing for supporting a record blank, a marker, means including a resilient hand normally supporting the marker in spaced relation with the blank, means in the housing for rotating the marker-supporting means in response to pressure to be recorded, a circular striker, means yieldingly supporting the striker in spaced relation with said hand, and means responsive to interrupted travel of the housing for driving the striker against said hand to effect contact of the marker with the blank.

2. A pressure indicating device including a housing, means in the housing for supporting a record blank, a marker, means including a resilient hand normally supporting the marker in spaced relation with the blank, means in the housing for rotating the marker-supporting means in response to pressure to be recorded, a striker, means including a bridge on said blank-supporting means for yieldingly supporting the striker in spaced relation with said hand, and a weighted member responsive to interrupted travel of the housing for driving the striker against said hand to effect contact of the marker with the blank.

3. A pressure indicating device including a housing, means in the housing for supporting a record blank, a marker, means including a resilient hand normally supporting the marker in spaced relation with the blank, means in the housing for rotating the marker-supporting means in response to pressure to be recorded, a bridge on said blank-supporting means, a striker yieldingly supported on the bridge in spaced relation with the hand, stop means on the striker adapted to engage said bridge for limiting downward movement of the striker, and a yieldingly supported weight member slidable in the housing and responsive to interrupted travel of the housing for driving the striker against said hand to effect contact of the marker with the blank.

4. A device of the character described including a housing, means in the housing for supporting a record blank, a marker, a shaft rotatable in the housing, a resilient hand fixed transversely on said shaft and carrying the marker on one end and a stop lug on its opposite end, means in the housing for rotating said shaft in response to pressure to be recorded, and means responsive to irregular movement of the housing for flexing both ends of said hand to effect contact of the marker and lug with said blank and prevent lateral bending of the shaft.

IRWIN L. DUNN.
HARRY F. WRIGHT.
HAROLD S. CROOKS.